United States Patent
Schnabel et al.

(10) Patent No.: US 11,285,579 B2
(45) Date of Patent: Mar. 29, 2022

(54) METHOD FOR PRODUCING BEARING COMPONENTS

(71) Applicant: Schaeffler Technologies AG & Co. KG, Herzogenaurach (DE)

(72) Inventors: Wolfgang Schnabel, Shanghai (CN); Martin Schreiber, Singapore (SG); Oliver Jung, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 523 days.

(21) Appl. No.: 16/329,066

(22) PCT Filed: Sep. 13, 2017

(86) PCT No.: PCT/DE2017/100773
§ 371 (c)(1),
(2) Date: Feb. 27, 2019

(87) PCT Pub. No.: WO2018/077327
PCT Pub. Date: May 3, 2018

(65) Prior Publication Data
US 2019/0240806 A1    Aug. 8, 2019

(30) Foreign Application Priority Data

Oct. 26, 2016 (DE) .......................... 102016221046.7

(51) Int. Cl.
*B24B 49/02*    (2006.01)
*B24B 49/05*    (2006.01)
(Continued)

(52) U.S. Cl.
CPC .............. *B24B 51/00* (2013.01); *B24B 19/06* (2013.01); *B24B 27/0023* (2013.01);
(Continued)

(58) Field of Classification Search
CPC ..... B24B 11/02; B24B 19/06; B24B 27/0023; B24B 27/0069; B24B 27/0076;
(Continued)

(56) References Cited

U.S. PATENT DOCUMENTS 3,562,960 A * 2/1971 Thielenhaus ....... B24B 27/0023
451/163
4,237,598 A * 12/1980 Williamson ......... B23Q 7/1426
483/4
(Continued)

FOREIGN PATENT DOCUMENTS

CN    2904602 Y    5/2007
CN    102996625 A    3/2013
(Continued)

OTHER PUBLICATIONS

ISO 15312; 'Rolling bearings—Thermal speed rating—Calculation and coefficients', International Standard, 19 pages, First edition, Dec. 1, 2003.
(Continued)

*Primary Examiner* — Eileen P Morgan

(57) ABSTRACT

A method for producing bearing components includes providing a first bearing component, a second bearing component, a first production line, and a second production line. The first production line has a first grinding machine, a first honing machine, a first measuring unit, and a first conveyor unit. The second production line has a second grinding machine, a second honing machine, and a second conveyor unit. The method also includes grinding and honing the first bearing component, measuring a first dimension of the first bearing component, grinding and honing the second bearing component, and combining the first bearing component and the second bearing component to form a roller bearing or a slide bearing. The first production line and the second production line are operated in a synchronized manner such
(Continued)

that the second grinding machine or the second honing machine is operated under closed-loop control using the first dimension.

15 Claims, 2 Drawing Sheets

(51) Int. Cl.
| | |
|---|---|
| *B24B 19/06* | (2006.01) |
| *B24B 51/00* | (2006.01) |
| *F16C 33/14* | (2006.01) |
| *F16C 33/64* | (2006.01) |
| *F16C 43/02* | (2006.01) |
| *F16C 43/04* | (2006.01) |
| *B24B 49/03* | (2006.01) |
| *F16C 41/04* | (2006.01) |
| *B24B 27/00* | (2006.01) |
| *B24B 41/00* | (2006.01) |
| *F16C 17/00* | (2006.01) |
| *F16C 19/00* | (2006.01) |

(52) U.S. Cl.
CPC ........ *B24B 27/0069* (2013.01); *B24B 41/005* (2013.01); *B24B 49/02* (2013.01); *B24B 49/03* (2013.01); *B24B 49/05* (2013.01); *F16C 33/14* (2013.01); *F16C 33/64* (2013.01); *F16C 41/04* (2013.01); *F16C 43/02* (2013.01); *F16C 43/04* (2013.01); *F16C 17/00* (2013.01); *F16C 19/00* (2013.01)

(58) Field of Classification Search
CPC ....... B24B 33/02; B24B 33/04; B24B 41/005; B24B 49/02; B24B 49/03; B24B 49/04; B24B 49/05; B24B 51/00; F16C 33/14; F16C 33/64; F16C 43/02; F16C 43/04
USPC ................ 451/5, 49, 50, 51, 52, 57, 65, 336
See application file for complete search history.

(56) References Cited

U.S. PATENT DOCUMENTS

| | | | |
|---|---|---|---|
| 5,161,332 A * | 11/1992 | Koch | B24B 19/06 |
| | | | 451/247 |
| 7,086,518 B1 * | 8/2006 | Hranica | B23Q 41/06 |
| | | | 198/341.03 |
| 7,347,765 B2 * | 3/2008 | Koch | B23Q 7/1405 |
| | | | 451/10 |
| 10,695,885 B2 * | 6/2020 | Schnabel | B23Q 11/0042 |
| 10,786,846 B2 * | 9/2020 | Napp | F16C 17/03 |
| 2006/0203230 A1 | 9/2006 | Nobuyuki | |
| 2006/0226584 A1 * | 10/2006 | Maeda | F16C 19/30 |
| | | | 266/104 |
| 2010/0080676 A1 * | 4/2010 | Niitani | B23Q 7/04 |
| | | | 414/226.01 |

FOREIGN PATENT DOCUMENTS

| | | |
|---|---|---|
| CN | 103115071 A | 5/2013 |
| DE | 19822204 A1 | 11/1999 |
| DE | 19758774 B4 | 7/2004 |
| DE | 102011012323 A1 | 8/2012 |
| EP | 1801577 A1 | 6/2007 |
| GB | 837870 A | 6/1960 |
| JP | H05192846 A | 8/1993 |

OTHER PUBLICATIONS

Wälzlager; ("Roller bearing") catalog published by Schaeffler KG, 6 pages, 1st revised and expanded edition of Oct. 2008.

* cited by examiner

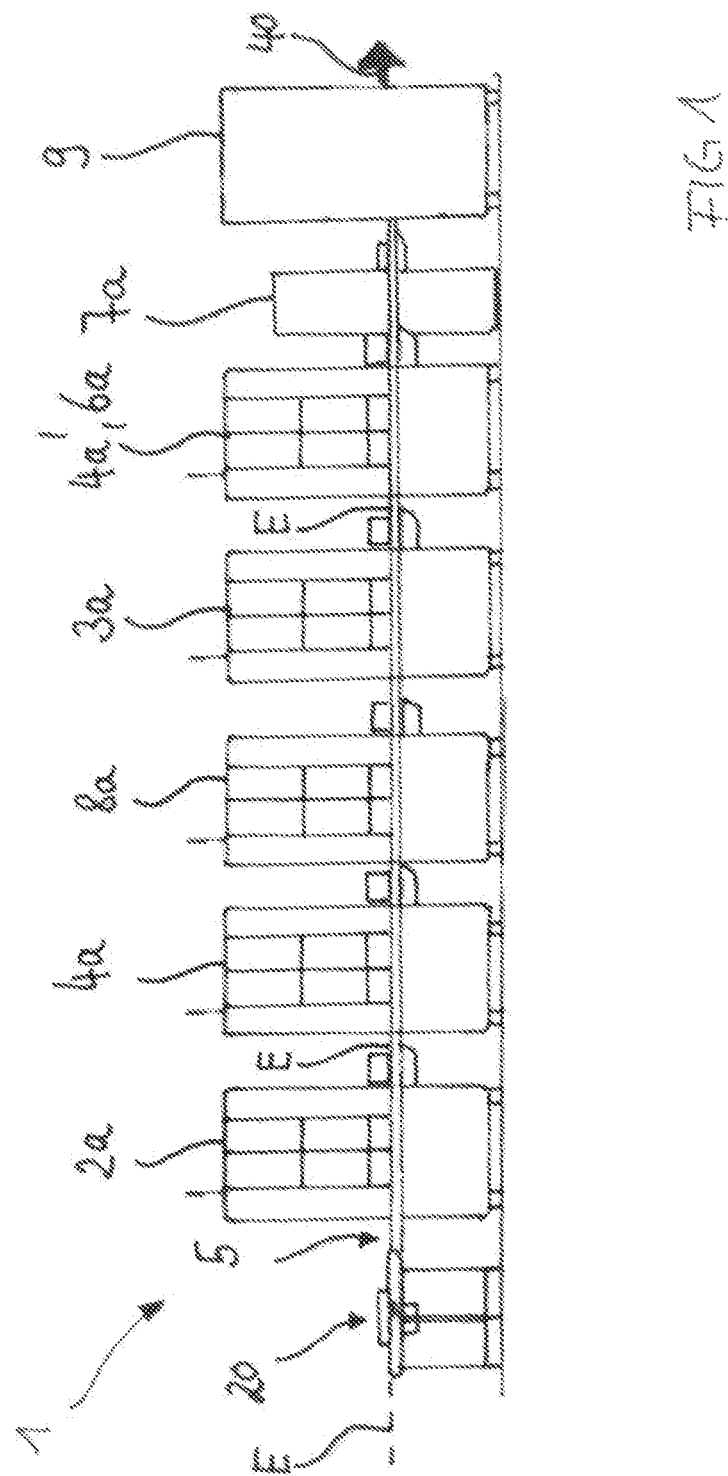

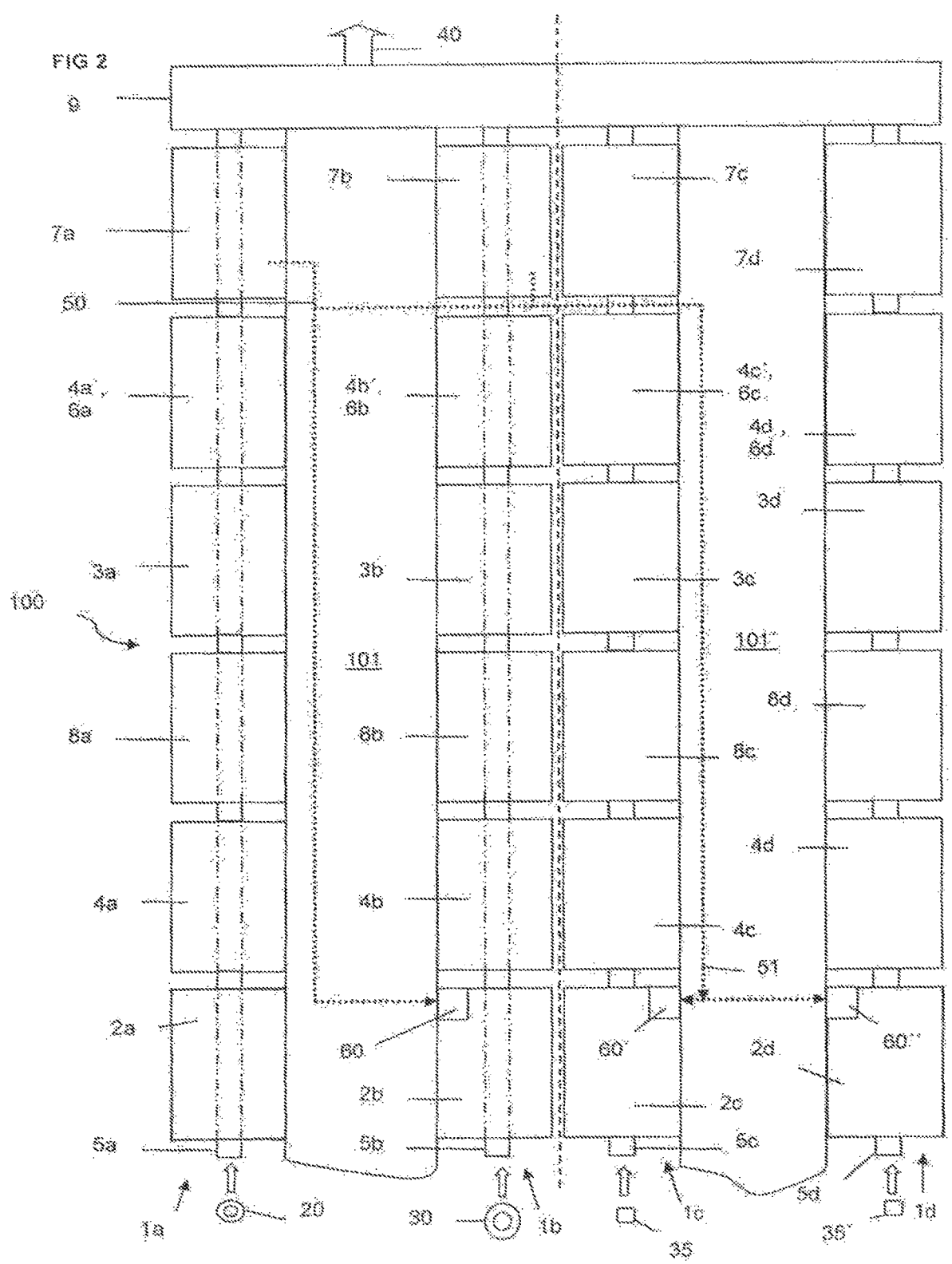

METHOD FOR PRODUCING BEARING COMPONENTS

CROSS-REFERENCE TO RELATED APPLICATIONS

This application is the United States National Phase of PCT Appln. No. PCT/DE2017/100773 filed Sep. 13, 2017, which claims priority to German Application No. DE102016221046.7 filed Oct. 26, 2016, the entire disclosures of which are incorporated by reference herein.

TECHNICAL FIELD

The disclosure relates to a method for producing bearing components to form a roller or slide bearing. Furthermore, the disclosure relates to a roller bearing produced by this method. The disclosure further relates to a production system including at least two production lines for producing bearing components and at least one assembly unit arranged downstream of the production lines for assembling a roller or slide bearing from the bearing components.

BACKGROUND

Known methods for producing roller or slide bearings using at least two production lines are known. Each production line includes at least one grinding machine, at least one honing machine, at least one measuring unit for measuring the bearing components and at least one conveyor unit. Each bearing component is transported by means of the at least one conveyor unit along the respective production line. At least one grinding operation of each bearing component proceeds by means of the at least one grinding machine and at least one honing operation of each bearing component proceeds by means of the at least one honing machine. A first bearing component of the bearing components is measured in at least one of the at least two production lines prior to the grinding operation and/or after the grinding operation and/or after honing to determine at least one dimension of the first bearing component by means of the at least one measuring unit.

A production system including at least two production lines for producing bearing components and at least one assembly unit arranged downstream of the production lines for assembling a roller or slide bearing from the bearing components is known. Each production line respectively includes at least one grinding machine, at least one honing machine, at least one measuring unit for measuring the bearing components and at least one conveyor unit. The bearing components may be transported along the respective production line by means of the at least one conveyor unit and in the process may be supplied to the at least one grinding machine and the at least one honing machine. A first bearing component of the bearing components is measurable in at least one of the at least two production lines prior to the grinding operation and/or after the grinding operation and/or after honing to determine at least one dimension of the first bearing component.

BRIEF SUMMARY

The disclosure describes a method for producing bearing components to form a roller or slide bearing. At least two production lines are used. Each production line includes at least one grinding machine, at least one honing machine, at least one measuring unit for measuring the bearing components and at least one conveyor unit. Each bearing component is transported along the respective production line by means of the at least one conveyor unit. At least one grinding operation of each bearing component proceeds by means of the at least one grinding machine and at least one honing operation of each bearing component proceeds by means of the at least one honing machine. A first bearing component of the bearing components is measured in at least one of the at least two production lines prior to the grinding operation and/or after the grinding operation and/or after the honing to determine at least one dimension of the first bearing component by means of the at least one measuring unit. The at least two production lines are operated in synchronized manner, such that closed-loop control of the grinding operation and/or honing for producing a further bearing component proceeds in the at least one further production line on the basis of the at least one determined dimension of the first bearing component. The first bearing component and the at least one further bearing component are combined with one another to form the roller or slide bearing.

Bearing components of roller or slide bearings are accordingly produced on the production lines which are matched directly with regard to dimensions and tolerances and fit together precisely. The complex, hitherto necessary bringing together (known as "pairing") for example of a bearing component in the form of an inner ring with a bearing component in the form of an outer ring which matches dimensionally and with regard to tolerance can be dispensed with. Roller or slide bearings are thereby directly producible with low bearing clearance and low running noise.

The bearing component may be configured as a bearing ring, e.g., as a bearing outer ring or as a bearing inner ring, or as a rolling element.

Where two production lines are present, a bearing inner ring and a bearing outer ring of roller or slide bearings are produced on the two production lines which fit directly together with regard to dimensions and tolerances. The complex, hitherto necessary bringing together (pairing) of a bearing inner ring with a bearing outer ring which matches dimensionally and with regard to tolerance can be dispensed with. Slide bearings can thereby be produced with low bearing clearance and low running noise.

A first production line for bearing inner rings and a further production line extending parallel thereto for bearing outer rings are, for example, synchronized with one another. In this case, measurement results for the dimensions produced of the available bearing inner rings, for example, after hard machining, from the first production line, are transmitted to production units, in the form of soft machining unit(s), for example, of the further production line (or vice versa) and specified dimensions for soft machining on the second production line (in the reverse case on the first production line) are accordingly matched thereto.

Once the bearing inner ring has been combined with the produced bearing outer ring matched thereto, rolling elements with matching tolerances and originating from standard processes may be specifically combined therewith. Alternatively, coordinated production also of the required rolling elements may proceed on a likewise synchronized third production line. Since one bearing inner ring, one bearing outer ring and a plurality of rolling elements are normally required per roller bearing, the presence of a plurality of parallel third production lines for producing rolling elements may be preferred. In this case, the required number of rolling elements is produced synchronously with the bearing inner ring and bearing outer ring to be assembled therewith and the corresponding dimensional adaptation performed.

In the disclosed method, at least three production lines may be operated in synchronized manner. The first bearing component is measured on at least one first production line of the at least three production lines prior to the grinding operation and/or after the grinding operation and/or after honing to determine the at least one dimension of the first bearing component. Closed-loop control of the grinding operation and/or of the honing to produce a second bearing component proceeds on the second production line on the basis of the at least one determined dimension of the first bearing component. The second bearing component is measured on the second production line prior to the grinding operation and/or after the grinding operation and/or after honing to determine at least one further dimension of the second bearing component. Closed-loop control of the grinding operation and/or of the honing to produce at least one third bearing component proceeds on the at least one third production line on the basis of at least the determined dimension and/or the determined further dimension.

This method with three or more production lines is suitable for example the production of roller bearings in which bearing components have to be produced in the form of bearing inner rings, bearing outer rings and rolling elements and brought together for final assembly.

In this case, the at least three production lines are synchronized such that the measurement results for the dimensions produced of the bearing inner rings and bearing outer rings available, for example after hard machining, may be transmitted to soft machining unit(s) of the at least one third production line and specified dimensions for soft machining on the third production line are accordingly matched thereto for production of the rolling elements. In this case, soft machining proceeds prior to hardening and hard machining after hardening of the bearing component.

In this way, bearing inner rings and bearing outer rings and rolling elements are produced on the at least three production lines which match one another directly in dimensions and tolerances. The complex, hitherto necessary bringing together (known as "pairing") of a bearing inner ring with a bearing outer ring which matches dimensionally and with regard to tolerance and with a presorted group of rolling elements can be dispensed with. This makes it possible to avoid the normal sorting devices for rolling elements of specific measurement classes and magazines for storing the respective measurement classes when assembling rolling elements.

Production and production line complexity are simplified and slimmed down by these measures.

In an example embodiment, each bearing component passes along the respective production line lying on a constant horizontal plane (E). It has proven useful in this instance for a vertical grinding machine to be used as the at least one grinding machine.

An improvement in the dimensional stability of a bearing component may be achieved if the number of mechanical interventions affecting the bearing component is reduced. It may be effective with regard to the desired dimensional stability and desired low tolerances to transport the bearing component along the production line on a constant horizontal plane. The level of the center of gravity of a bearing component can in this case be shifted by up to ±10 cm, for example up to ±5 cm and still be considered to be transport in a constant horizontal plane. However, production units should allow such a procedure. In this case, the at least one grinding machine may be provided in the form of a vertical grinding machine. Such a vertical grinding machine may be incorporated into a production line in which the bearing component runs along the production line on a constant horizontal plane. A reduction in contact between bearing components can also be achieved and has a positive effect on the dimensional stability and tolerances of a bearing component. When transporting bearing components along the production line on a constant horizontal plane, it is largely possible to dispense with grippers, ramps and chutes.

In an example configuration of the method, the at least one honing machine takes the form of a vertical honing machine. Such a vertical honing machine may be incorporated into a production line including vertical grinding machines and likewise enables transport of the respective bearing component along the production line on a constant horizontal plane. The link between a vertical grinding machine and a vertical honing machine may be formed by a conveyor unit in the form of a conveyor belt. Alternatively, a conveyor unit incorporated into the honing machine and a further conveyor unit incorporated into the vertical grinding machine may be used to link these production units.

In an example embodiment, the bearing components pass along the at least two production lines on the same horizontal plane E. This simplifies the process of bringing together ready-machined bearing components from different production lines.

The production line used in the method may be configured to include at least one demagnetization unit. The bearing component is demagnetized after the grinding operation and/or the honing. The production line may further include at least one demagnetization unit for demagnetizing the bearing components. The demagnetization step allows the machined bearing component to be thoroughly cleaned of metal particles or metal filings.

Further production units may be incorporated into the production line, e.g., at least one of the following units: a milling machine, a lathe, a lapping machine, a drill, a punching unit, a pressing unit, a heat treatment unit, a hardening unit, a drying unit, an automatic feed unit and/or at least one automatic packaging unit. A soft-machining unit as mentioned above may be a material-removing unit such as a grinding machine or a milling machine, where this is arranged upstream of a hardening unit in the direction in which a bearing component is transported along a production line. Conversely, a hard-machining unit as mentioned above may be a material-removing unit such as a grinding machine or a milling machine, where this is arranged downstream of a hardening unit in the direction in which a bearing component is transported along a production line.

The bearing component may be cleaned in the at least one cleaning unit after honing and/or after demagnetization. This serves to clean the bearing components. Adherent metal particles or filings, lubricant oil, cutting fluids, dirt and the like are removed. In this case, a cleaning unit may be a washing unit and/or a gas jet cleaning system. For example, a dimension of a bearing component is determined after passage through such a cleaning unit so as to avoid measuring errors due to adherent metal dust or filings.

In an example embodiment, at least one assembly unit arranged downstream of the at least two production lines is provided, in which the first bearing component and the at least one further bearing component to be combined together into the roller or slide bearing are assembled. Such immediate combination and assembly of the bearing components after production thereof makes it possible to avoid complex logistical tracking of the bearing components produced to match one another.

Furthermore, additional bearing components, such as cages or cage segments, seals, textile sliding material inserts, lubricants, measurement devices and so on may also be provided which are brought together in the assembly unit with the first bearing component and the at least one further bearing component and joined together to yield the finished roller or slide bearing. These additional bearing components may originate from further synchronized production lines.

In an example embodiment, a production system includes at least two production lines for producing bearing components and at least one assembly unit arranged downstream of the production lines for assembling a roller or slide bearing from the bearing components. Each production line respectively includes at least one grinding machine, at least one honing machine, at least one measuring unit for measuring the bearing components and at least one conveyor unit. The bearing components may be transported along the respective production line by the at least one conveyor unit and in the process may be supplied to the at least one grinding machine and the at least one honing machine. A first bearing component of the bearing components is measurable in at least one of the at least two production lines prior to the grinding operation and/or after the grinding operation and/or after honing to determine at least one dimension of the first bearing component. The at least two production lines are connected together by at least one data transmission line and are operable in synchronized manner such that the at least one determined dimension of the first bearing component may be transmitted at least to one further production line of the at least two production lines. The grinding operation and/or the honing to produce a further bearing component on the at least one further production line is closed-loop controlled on the basis of the at least one determined dimension of the first bearing component.

Such a production system needs no sorting or intermediate storage steps and no devices necessary therefor have to be provided, as is the case with conventional production systems for roller or slide bearings. Roller or slide bearings may nonetheless be provided in the final assembled state which have low bearing clearance and running noise.

Each production line is may be configured such that the bearing components pass therealong on a constant horizontal plane E. As already described above, it has been found that an improvement in the dimensional stability of a bearing component may be achieved if the number of mechanical interventions affecting the bearing component is reduced.

In one example embodiment of the production system, at least one operator aisle is present. A production line is arranged on either side of each operator aisle, the control and display units of which are arranged facing one another.

At least one assembly unit may be linked together with the at least two production lines and set up for final assembly of the roller or slide bearing including the bearing components originating from the at least two production lines.

In an example embodiment, at least three production lines may be operated in synchronized manner.

A roller bearing may be produced using the disclosed method where the running noise of the roller bearing has a maximum sound pressure level of 30 decibels, at most 20 decibels, for example, measured at a thermal reference speed $n_B$ (to ISO 15312, as at October 2008) of the roller bearing. The thermal reference speed is the speed at which, under defined reference conditions, defined in the above-stated ISO 15312, a bearing temperature of +70° C. is established. On the reference conditions, see also the "Wälzlager" ("Roller bearing") catalog published by Schaeffler K G, 1st revised and expanded edition of October 2008.

The running noise of the roller bearing is conventionally determined after a short, defined run-in phase, so as to rule out a moment of starting friction. Running noise is a measurable parameter and is directly related to the quality of the roller bearing. The lower the running noise, the higher the quality and longer the service life of the roller bearing. Three frequencies (high, low and medium frequencies) are conventionally measured using a microphone or a structure-borne noise sensor. To this end, the bearing rings are loaded with a defined measuring force and a defined speed is selected. The running noise of a roller bearing may in this case be reduced by greasing. The required maximum sound pressure level here applies to a greased bearing.

In general, the slide or roller bearings assembled from the bearing components produced using the disclosed method exhibit low tolerances and smooth running, resulting in low/quiet running noise during operation. In this way, lower bearing clearances are achieved compared with conventional production systems in which the bearing components are produced separately, followed by sorting and pairing. The resultant smoother running of the roller bearing can be measured, for example, using structure-borne noise sensors.

The frequency spectrum associated with the respective bearing may be stored on the respective bearing to identify (copy protection) and verify its service life and identify maintenance requirements. In this way, the original frequency spectrum and the measurable frequency spectrum present after a running time of a given number of hours may also be compared with one another at the place of use of the bearing and measures taken on the basis thereof, for maintenance purposes, for example. As an alternative to storage of the frequency spectrum, features characterizing the spectrum, such as a frequency amplitude etc., may also be stored.

Roller or slide bearings produced using the proposed production method are identifiable via their frequency spectrum or characterizing features of the spectrum. Copy protection for the roller or slide bearing may be provided by storing the frequency spectrum thereof or characterizing features of the spectrum on the roller or slide bearing.

BRIEF DESCRIPTION OF THE DRAWINGS

FIGS. 1 to 2 show examples of a production line, a production system and a method for producing bearing components. Thus, FIG. 1 shows a production line; and, FIG. 2 shows a production system including four production lines for producing bearing components.

DETAILED DESCRIPTION

FIG. 1 shows a production line 1 for producing a bearing component, such as a bearing ring 20. For simplicity's sake, the blank to be machined, which is formed into the bearing ring 20 by machining as it passes along the production line 1, is here already designated with reference sign 20. The production line 1 includes a plurality of production units in the form of a grinding machine 2a, a first cleaning unit 4a, a hardening unit 8a, a honing machine 3a, a further cleaning unit 4a' combined with a demagnetization unit 6a, a measuring unit 7a for measuring the bearing component and a conveyor unit 5. The bearing component is transported along the production line 1 by means of the conveyor unit 5. Each bearing component undergoes a grinding operation using the grinding machine 2a and honing using the honing machine 3a. Prior to the grinding operation and/or after the grinding operation and/or after honing, the bearing component is measured to determine at least one dimension of this first bearing component using the measuring unit 7a.

The production line 1 is further configured such that the bearing components pass therealong lying on a constant horizontal plane E. The conveyor unit 5 may include a plurality of conveyor belts, which directly adjoin one another and are set up to transport the blanks to be machined along the production line 1 in the horizontal plane E. In this respect, conveyor units 5 incorporated into the production units and/or separate conveyor units 5 may be used on the production line 1. Downstream of the production line 1 is an assembly unit 9, into which the finished, measured bearing ring 20 is fed and assembled with further bearing components, matched directly thereto with regard to their dimensions, from parallel production lines (ref. FIG. 2) to yield a roller or slide bearing 40.

FIG. 2 shows a production system 100 including four parallel production lines 1a, 1b, 1c, 1d for producing bearing components. In this case, a first production line 1a and a second production line 1b are associated with a first operator aisle 101, while a third production line 1c and a fourth production line 1d are associated with a second operator aisle 101'. The two system parts are divided by a central, dashed dividing line, since the left-hand part includes the first production line 1a and the second production line 1b may also be operated without the right-hand part including the third production line 1c and the fourth production line 1d. Thus, during slide bearing production, just two parallel, synchronized production lines for producing a bearing inner ring and a bearing outer ring may be present. It is however also possible when producing roller bearings for just two synchronized production lines to be present for producing, for example, a bearing inner ring and a bearing outer ring. The rolling elements originate, as hitherto, from a sorting device for rolling elements of specific measurement classes and are stored in magazines for the respective measurement classes for assignment and assembly of the rolling elements.

On the production line 1a, a first bearing component is produced in the form of a bearing ring 20, here, for example, in the form of a bearing inner ring. Here too, for simplicity's sake the blank to be machined, which is formed into the bearing ring 20 by machining as it passes along the first production line 1a, is already designated with reference sign 20. The first production line 1a includes a plurality of production units in the form of a grinding machine 2a, a first cleaning unit 4a, a hardening unit 8a, a honing machine 3a, a further cleaning unit 4a' combined with a demagnetization unit 6a, a measuring unit 7a for measuring the first bearing component and a conveyor unit 5a. In the measuring unit 7a of the first production line 1a a dimension, here the external diameter, of the bearing inner ring is measured.

On the second production line 1b a second bearing component is produced in the form of a bearing ring 30, here, for example, in the form of a bearing outer ring. Here too, for simplicity's sake the blank to be machined, which is formed into the bearing ring 30 by machining as it passes along the second production line 1b, is already designated with reference sign 30. The second production line 1a includes a plurality of production units in the form of a grinding machine 2b, a first cleaning unit 4b, a hardening unit 8b, a honing machine 3b, a further cleaning unit 4b' combined with a demagnetization unit 6b, a measuring unit 7b for measuring the bearing component and a conveyor unit 5b. In the measuring unit 7b of the second production line 1b a dimension, here the internal diameter, of the bearing outer ring is measured.

On the third production line 1c a third bearing component in the form of a rolling element 35 is produced, in the shape of a cylinder, for example. Here too, for simplicity's sake the blank to be machined, which is formed into the rolling element 35 by machining as it passes along the third production line 1c, is already designated with reference sign 35. The third production line 1c includes a plurality of production units in the form of a grinding machine 2c, a first cleaning unit 4c, a hardening unit 8c, a honing machine 3c, a further cleaning unit 4c' combined with a demagnetization unit 6c, a measuring unit 7c for measuring the bearing component and a conveyor unit 5c.

On the fourth production line 1d a further third bearing component is produced in the form of a rolling element 35', here, like on the third production line 1c, likewise in the shape of a cylinder. Here too, for simplicity's sake the blank to be machined, which is formed into the rolling element 35' by machining as it passes along the fourth production line 1d, is already designated with reference sign 35'. The fourth production line 1d includes a plurality of production units in the form of a grinding machine 2d, a first cleaning unit 4d, a hardening unit 8d, a honing machine 3d, a further cleaning unit 4d' combined with a demagnetization unit 6d, a measuring unit 7d for measuring the bearing component and a conveyor unit 5d.

The grinding machines 2a, 2b, 2c, 2d here all take the form of vertical grinding machines and the honing machines 3a, 3b, 3c, 3d all take the form of vertical honing machines. This enables the bearing components to pass along the production lines 1a, 1b, 1c, 1d on a common constant horizontal plane E (ref. FIG. 1). This simplifies assembly of the bearing components into a roller or slide bearing 40 in an assembly unit 9 arranged downstream of the production lines 1a, 1b, 1c, 1d.

The first production line 1a and the second production line 1b are connected together by a data transmission line 50 and synchronized in such a way that the determined dimension of the first bearing component can be transmitted to the second production line 1b. The grinding operation and/or the honing to produce the second bearing component on the second production line 1b proceeds under closed-loop control on the basis of the determined dimension of the first bearing component. In this case, the measured external diameter of the bearing ring 20 in the form of the bearing inner ring is used in a closed-loop control unit 60, which is incorporated into the grinding machine 2b of the second production line 1b, to determine a specified dimension for an internal diameter of the bearing ring 30 in the form of the bearing outer ring. The bearing ring 30 is produced with dimensions which are matched to the dimensions of the bearing ring 20.

The first production line 1a and the second production line 1b are connected to the third production line 1c by a data transmission line 51 and synchronized in such a way that the determined dimension of the first bearing component and the determined further dimension of the second bearing component may be transmitted to the third production line 1c. The grinding operation and/or the honing to produce the third bearing component on the third production line 1c proceeds under closed-loop control on the basis of the determined dimensions of the first bearing component and the second bearing component. In this case, the measured external diameter of the bearing ring 20 in the form of the bearing inner ring and the measured internal diameter of the bearing ring 30 in the form of the bearing outer ring is used in a closed-loop control unit 60', which is incorporated into the grinding machine 2c of the third production line 1c, to determine a specified dimension for the cylindrical rolling elements 35 which are to be directly assembled with the bearing rings 20, 30. The rolling elements 35 are produced with dimensions which are matched to the dimensions of the bearing ring 20 and the bearing ring 30.

The fourth production line 1d, and if necessary also yet further production lines, is here provided to enable provision of the necessary number of rolling elements 35 for the roller bearing to be assembled in parallel with production of the bearing rings 20, 30. The fourth production line 1d is synchronized with the first production line 1a and with the second production line 1b in a similar manner to synchronization of the third production line 1c. In this case, the measured external diameter of the bearing ring 20 in the form of the bearing inner ring and the measured internal diameter of the bearing ring 30 in the form of the bearing outer ring is used in a closed-loop control unit 60", which is incorporated into the grinding machine 2d of the fourth production line 1d, to determine a specified dimension for the cylindrical rolling elements 35' which are to be directly assembled with the bearing rings 20, 30. The rolling elements 35' are produced with dimensions which are matched to the dimensions of the bearing ring 20 and the bearing ring 30.

Assembly of the bearing components, i.e. of the bearing rings 20, 30 and optionally of the rolling elements 35, 35', which have been produced with matching dimensions, to yield a roller or slide bearing 40, proceeds in the assembly unit 9 downstream of the production lines 1a, 1b, 1c, 1d. This latter is set up for final assembly of a roller or slide bearing 40 including the bearing components originating from the production lines. Intermediate storage of the produced bearing components is dispensed with, and thus also the risk of the dimensional stability of the produced bearing components being impaired again for example by mechanical interventions in the event of intermediate or temporary storage, for example by finished bearing components coming into contact with one another.

REFERENCE NUMERALS 1, 1a, 1b, 1c, 1d Production line
2a, 2b, 2c, 2d Grinding machine, vertical grinding machine
3a, 3b, 3c, 3d Honing machine, vertical honing machine
4a, 4b, 4c, 4d, 4a', 4b', 4c', 4d' Cleaning unit
5, 5a, 5b, 5c, 5d Conveyor unit
6a, 6b, 6c, 6d Demagnetization unit
7a, 7b, 7c, 7d Measuring unit
8a, 8b, 8c, 8d Hardening unit
9 Assembly unit
20, 30 Bearing ring
35, 35' Rolling element
40 Roller or slide bearing
50, 51 Data transmission line
60, 60', 60" Closed-loop control unit
100 Production system
101, 101' Operator aisle
E Horizontal plane

The invention claimed is:

1. A method for producing bearing components comprising:
providing a first bearing component and a second bearing component;
providing a first production line comprising a first grinding machine, a first honing machine, a first measuring unit, and a first conveyor unit;
providing a second production line comprising a second grinding machine, a second honing machine, and a second conveyor unit;
transporting the first bearing component with the first conveyor unit;
grinding the first bearing component with the first grinding machine and honing the first bearing component with the first honing machine;
measuring a first dimension of the first bearing component with the first measuring unit;
transporting the second bearing component with the second conveyor unit;
grinding the second bearing component with the second grinding machine and honing the second bearing component with the second honing machine; and,
combining the first bearing component and the second bearing component to form a roller bearing or a slide bearing, wherein the first production line and the second production line are operated in a synchronized manner such that the second grinding machine or the second honing machine is operated under closed-loop control using the first dimension.

2. The method of claim 1, wherein the first bearing component is a one of a bearing outer ring or a bearing inner ring and the second bearing component is the other of the bearing outer ring or the bearing inner ring.

3. The method of claim 1, wherein the measuring a dimension of the first bearing component with the measuring unit occurs prior to the grinding the first bearing component with the first grinding machine.

4. The method of claim 1, wherein the measuring a dimension of the first bearing component with the measuring unit occurs after the grinding the first bearing component with the first grinding machine.

5. The method of claim 1, wherein the measuring a dimension of the first bearing component with the measuring unit occurs after the honing the first bearing component with the first honing machine.

6. The method of claim 1 wherein the first bearing component and the second bearing component pass along the first production line and the second production line, respectively, lying on a constant horizontal plane (E).

7. The method of claim 1 further comprising providing an assembly unit, wherein the assembly unit combines the first bearing component and the second bearing component to form the roller bearing or the slide bearing.

8. The method of claim 1 further comprising:
providing the second production line with a second measuring unit;
measuring a second dimension of the second bearing component with the second measuring unit;
providing a third bearing component;
providing a third production line comprising a third grinding machine and a third honing machine, wherein the second production line and the third production line are operated in a synchronized manner such that the third grinding machine or the third honing machine is operated under closed-loop control using the first dimension or the second dimension.

9. The method of claim 8 further comprising providing an assembly unit, wherein the assembly unit combines the first bearing component, the second bearing component, and the third bearing component to form the roller bearing or the slide bearing.

10. A roller bearing produced using the method of claim 1, wherein a running noise of the roller bearing has a maximum sound pressure level of 30 decibels when measured at a thermal reference speed of the roller bearing.

11. A production system comprising:
- a first production line for producing a first bearing component, the first production line comprising a first conveyor unit, a first grinding machine, a first honing machine, and a first measuring unit for measuring a first dimension of the first bearing component;
- a second production line for producing a second bearing unit, the second production line comprising a second conveyor unit, a grinding machine and a honing machine; and,
- an assembly unit arranged downstream of the production lines for assembling the first bearing component and the second bearing component into a roller bearing or a slide bearing; and,
- a first data transmission line, wherein the first production line and the second production line are connected by the first data transmission line and are operable in a synchronized manner such that the first dimension is transmittable to the second production line by the first data transmission line for closed-loop control of the second grinding machine or the second honing machine.

12. The production system of claim 11, wherein the first production line and the second production line are configured such that the first bearing component and the second bearing component, respectively, pass along on a constant horizontal plane (E).

13. The production system of claim 11, further comprising an operator aisle between the first production line and the second production line, wherein:
- the first production line comprises a first display unit;
- the second production line comprises a second display unit; and,
- the first display unit faces the second display unit.

14. The production system of claim 11 further comprising a second data transmission line, wherein the assembly unit is connected to the first production line or the second production line by the second data transmission line.

15. The production system of claim 11, further comprising a third production line.

* * * * *